United States Patent [19]
Makimoto

[11] Patent Number: 4,972,737
[45] Date of Patent: Nov. 27, 1990

[54] CONTROL SYSTEM FOR ENGINE AND TRANSMISSION USING TWO POWER MODES

[75] Inventor: Seiji Makimoto, Kure, Japan

[73] Assignee: Mazda Motor Corporation, Hiroshima, Japan

[21] Appl. No.: 299,684

[22] Filed: Jan. 23, 1989

[30] Foreign Application Priority Data

Jan. 21, 1988 [JP] Japan .................................. 63-9690

[51] Int. Cl.$^5$ ............................................. B60K 41/06
[52] U.S. Cl. ....................................... 74/859; 74/872
[58] Field of Search ................. 74/857, 859, 860, 866; 123/344, 568, 569, 571

[56] References Cited

U.S. PATENT DOCUMENTS

| | | | |
|---|---|---|---|
| 4,184,461 | 1/1980 | Leung | 123/344 |
| 4,737,915 | 4/1988 | Hosaka | 74/866 X |
| 4,739,483 | 4/1988 | Ina et al. | 74/866 X |
| 4,823,642 | 4/1989 | Iwaki et al. | 74/860 |

FOREIGN PATENT DOCUMENTS

| | | | |
|---|---|---|---|
| 1163527 | 5/1977 | Japan | 123/568 |
| 59-134338 | 8/1984 | Japan . | |

Primary Examiner—Dwight Diehl
Assistant Examiner—Khoi Q. Ta
Attorney, Agent, or Firm—Wenderoth, Lind & Ponack

[57] ABSTRACT

A control system for a vehicle with an automatic transmission in which the gear ratio is automatically changed in accordance with the operating condition of the vehicle includes a control means set for at least a first range if air-fuel ratios to be determined in accordance with engine speed and a second range of air-fuel ratios for controlling the air-fuel ratio of the engine to enrich a fuel mixture more than in the first range of air-fuel ratios. A shift control system has a first shift characteristic setting means for setting a first shift characteristic, and a second shift characteristic setting means for setting a second shift characteristic such that an upshift is effected in a higher vehicle speed range than that in the first shift characteristic. A characteristic changing means selects the first shift characteristic during ordinary driving (i.e. non-power driving) and the second shift characteristic during a specific operating condition. An air-fuel ratio changing means expands the first range of air-fuel ratios toward the high-speed side of engine operation when the second shift characteristic has been selected by the characteristic changing means to narrow the second range of air-fuel ratios. Thus, when an acceleration force is demanded during ordinary driving, the vehicle is driven to gain a sufficient acceleration force, and at the same time the air-fuel ratio enrichment control is restrained to control the worsening of fuel economy.

10 Claims, 7 Drawing Sheets

CONTROL SYSTEM FOR ENGINE AND TRANSMISSION USING TWO POWER MODES

BACKGROUND OF THE INVENTION

1. Field of the Invention

The present invention relates to a control system for a vehicle with an automatic transmission which simultaneously controls an air-fuel ratio of an engine of the vehicle and shifting in the automatic transmission.

2. Description of the Prior Art

This type of control device has been proposed by Laid-Open Japanese Patent No. 59-134338, such control device being adapted to store in a memory a first shift pattern with an importance attached to output and a second shift pattern with an importance attached to fuel economy. Also stored in the memory are a first value of fuel enrichment corresponding to the first shift pattern and a second value of fuel enrichment corresponding to the second shift pattern, such that when the first shift pattern is selected, the shifting in the automatic transmission is controlled in accordance with the first shift pattern and at the same time the air-fuel ratio of the engine is controlled in accordance with the first value of fuel enrichment, and also that when the second shift pattern is selected, the automatic transmission is controlled in accordance with the second shift pattern and at the same time the air-fuel ratio of the engine is controlled in accordance with the second value of fuel enrichment.

This fuel enrichment at this time takes place within a high-speed range and within a high-load range where the flow rate of exhaust gases increases, gaining an effect of restraining a temperature rise of an exhaust system including an exhaust catalyst.

Therefore, selecting a shift pattern with an importance attached to fuel economy can improve the fuel economy by leaning out the air-fuel mixture, and also selecting a shift pattern with an importance attached to output can obtain sufficient output.

In the control device of the above-described arrangement, however, as a selector switch is used for the selection of the shift pattern with an importance attached to fuel economy as well as the shift pattern with an importance attached to the output, the operation of the selector switch will be complicated for a driver who wants some more acceleration force for a brief period of time (for example when accelerating for entering a superhighway or for passing another vehicle) during vehicle operation using the shift pattern with an importance attached to fuel economy. During this period of acceleration, therefore, it is very likely that acceleration is done by the use of the shift pattern with an importance attached to fuel economy.

In the shift pattern with an importance attached to fuel economy, an upshift line or position is set low. Therefore, an upshift is made into a gear on the high-speed side (i.e. to a higher gear) while the vehicle speed is still relatively low, and the accelerator pedal must be depressed substantially to obtain a sufficient acceleration force. Accordingly, the engine will be operated under a great load, and will require fuel enrichment, resulting in lowered fuel economy.

Automatically changing only the shift pattern over to another pattern with an importance attached to output, at the time of acceleration, will also increase the amount of fuel in the high-speed range of the engine, similarly resulting in lowered fuel economy.

This problem will happen not only in the above-described finitely variable automatic transmissions but also in infinitely variable transmissions.

SUMMARY OF THE INVENTION

The present invention has been accomplished in an attempt to solve the problem mentioned above, and has as an object the provision of a control system for a vehicle with an automatic transmission that can control shifting in the automatic transmission and the air-fuel ratio of the engine so as to obtain sufficient output while restraining worsening of fuel economy during acceleration.

For the purpose of solving the above-described problem, the control system of the present invention has an automatic transmission which automatically changes a gear ratio in accordance with the operating conditions of a vehicle, and a control means whereby there have been set at least a first range of air-fuel ratios to be determined in accordance with an engine speed and a second range of air-fuel ratios for controlling the air-fuel ratio of the engine toward enriching the mixture more than that in the first range of air-fuel ratios. This control system further has a shift control means including a means for setting a first shift characteristic, whereby the first shift characteristic has been set, and a means for setting a second shift characteristic, whereby the second shift characteristic is such that an upshift is made in a higher vehicle speed range than the first shift characteristic has been set. A characteristic shifting means selects the first shift characteristic during normal operation, and selects the second shift characteristic under specific operating conditions. An air-fuel ratios changing means narrows the second range of air-fuel ratios by expanding the first range of air-fuel ratios to the high-speed side of engine operation when the second shift characteristic has been selected by the characteristic changing means.

The automatic transmission is a multiple-range transmission having a plurality of gear ratios. A vehicle operating condition to be detected for automatically changing the gear ratio of such automatic transmission is determined by detecting vehicle speed and engine load by the use of sensors.

The first and second means for setting shift characteristics are electronic preset maps. The second shift characteristic is set by the second means for setting shift the characteristic to a vehicle speed at a high upshift point.

The specific condition in at which the second shift characteristic is selected by the characteristic changing means is an accelerating condition. A change from the first shift characteristic to the second shift characteristic is effected by this characteristic changing means when acceleration has been detected, and a change from the second shift characteristic to the first shift characteristic is effected when deceleration has been detected.

Resetting from the second shift characteristic to the first shift characteristic, which is effected by the use of the characteristic changing means, is done by upshifting the gear ratio of the automatic transmission one by one.

Furthermore, when the second shift characteristic has been selected by the characteristic changing means, the range of split air supply to an exhaust system catalyst of the vehicle is expanded toward the high-speed side of engine operation according to the expansion of the first range of air-fuel ratios toward the high-speed side of engine.

Here, the first range of air-fuel ratio is a feedback range which is controlled on the basis of a detected value of an O₂ sensor.

Furthermore, according to the present invention, the control system for vehicle with an automatic transmission that controls the engine air-fuel ratio in accordance with the engine speed and load and the vehicle speed and controls shifting in the automatic transmission, comprises a shift control means which has a shift schedule map for ordinary driving and another shift schedule map for acceleration with the upshift line set on the high-speed side of the vehicle more than that of the shift schedule map for ordinary driving, and controls the shifting in the automatic transmission by changing from the shift schedule map for ordinary driving to another map for acceleration when the required acceleration of the vehicle has exceeded a set value. An air-fuel ratio control means enriches the fuel mixture when the engine speed has exceeded a set value in ordinary driving, and narrows the speed range in which the fuel enrichment is controlled when the vehicle is driving with its required acceleration, exceeding a set value.

According to the above features of the present invention, when an acceleration force over its set value is demanded during ordinary driving, the first shift characteristic of the shift control means is changed to the second shift characteristic by the characteristic changing means or the shift schedule map for ordinary driving is changed over to one for acceleration, and therefore the shifting in the automatic transmission is controlled, thus moving the upshift point toward the high-speed side. This enables driving of the vehicle in low gear, gaining a sufficient acceleration force, and thereby decreasing the required amount of depression of the accelerator pedal. The engine, therefore, will be operated possibly within the medium-load and high-speed range. At the same time, the first range of air-fuel ratio is expanded by the air-fuel ratio changing means or the speed range for controlling the fuel enrichment by the air-fuel ratio control means is narrowed. Thus, the engine is so controlled as to restrain the enrichment of the air-fuel mixture in the high-speed range, and accordingly the air-fuel ratio is controlled to the vicinity of, or leaner than, a theoretical air-fuel ratio, consequently possibly controlling the worsening of fuel economy. The control of this fuel enrichment is performed only during acceleration, ending in a short time and accordingly not giving adverse effect, such as the temperature rise of the exhaust system, to engine performance.

BRIEF DESCRIPTION OF THE DRAWINGS

FIGS. 3(a) and 3(b) are engine air-fuel ratio control maps or graphs,

FIG. 3(a) being a map for ordinary driving, and FIG. 3(b) being a map for acceleration.

FIGS. 4(a) and 4(4) are secondary air supply maps or graphs, FIG. 4(a) being a map for ordinary driving, and FIG. 4(b) being a map for acceleration.

DESCRIPTION OF THE PREFERRED EMBODIMENT

One preferred embodiment of the present invention will be described in detail with reference to the accompanying drawings.

Figure 1:
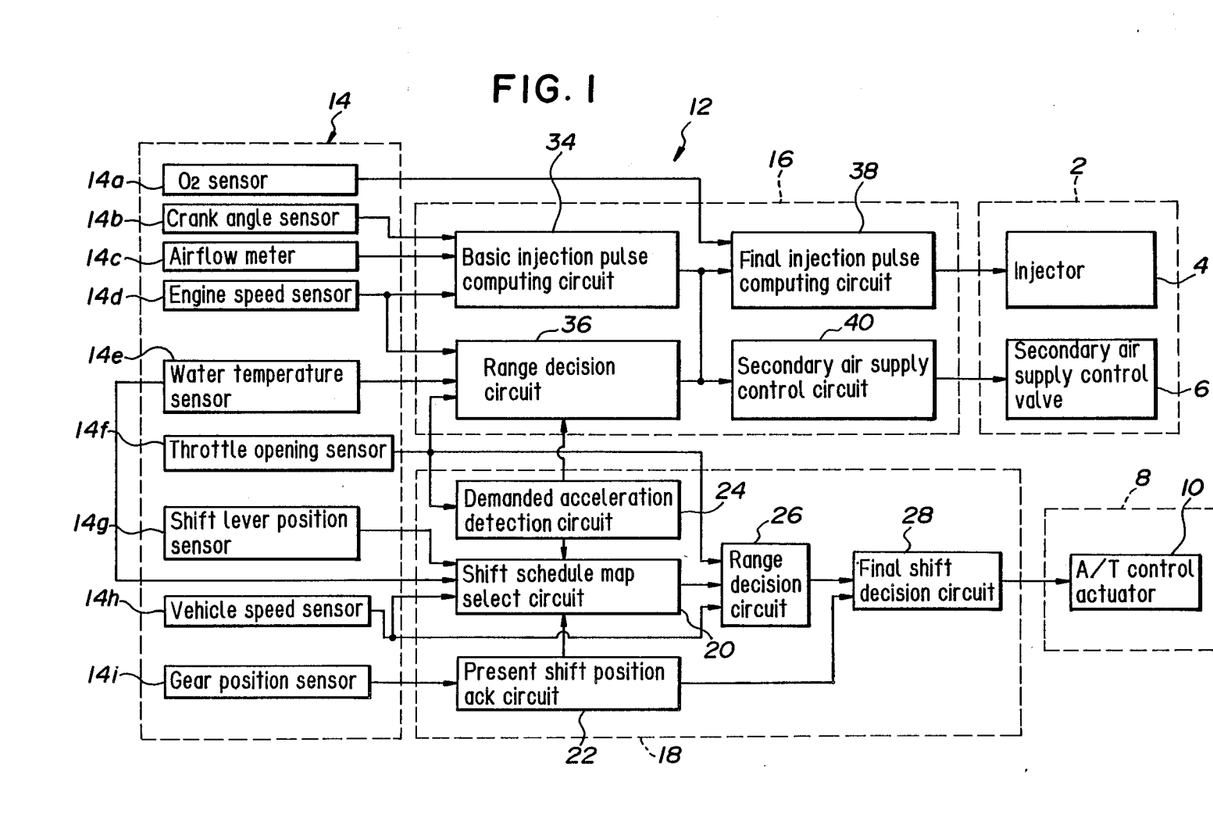
FIG. 1 is a circuit block diagram showing one preferred embodiment of a control system for a vehicle with an automatic transmission according to the present invention.

FIG. 1 is a block diagram showing the general constitution of the control device for a vehicle with automatic transmission of the present invention. In this drawing, numeral 2 is an engine; numeral 4 denotes an injector of the engine 2; numeral 6 represents a control valve installed in the exhaust system of the engine for supplying secondary air; numeral 8 indicates a multiple-speed automatic transmission having a plurality of gear ratios which are automatically changed in accordance with the operating condition of vehicle; and numeral 10 denotes an automatic transmission control actuator (control valve) of a hydraulic control circuit provided in the automatic transmission 8.

A control system 12, as illustrated, is constituted mainly of various sensors 14 which detect the operating condition of the engine 2, the driving condition of the automatic transmission 8, and vehicle speed etc.; a shift control means 18 which controls the shifting in the automatic transmission 8 on the basis of signals output from the various sensors 14; and an air-fuel ratio control means 16 which controls the air-fuel ratio of the engine 2.

The shift control means 18 has a function to control the shifting in the automatic transmission 8 by changing the shift schedule map or plan thereof for ordinary driving over to that for acceleration when demanded vehicle acceleration exceeds a set value, and comprises a shift schedule map selection circuit 20, a present shift position acknowledgement circuit 22, a demanded acceleration detection circuit 24, a range decision circuit 26, and a final shift decision circuit 28.

The demanded acceleration detection circuit 24, receiving a signal from a throttle opening sensor 14f, detects demanded acceleration from a change in the output value of the throttle opening sensor 14f.

The present shift position acknowledgement circuit 22 receives a signal output from a gear position sensor 14i disposed in the automatic transmission 8, and detects the present gear position from this output signal.

The shift schedule map selection circuit 20 is equivalent to the shift control means having first means for setting shift characteristics (i.e. a shaft pattern or schedule) which sets first shift characteristics, and second means for setting shift characteristics (i.e. a shift pattern or schedule) which sets the second shift characteristics at which a shift to a higher gear is achieved at a higher vehicle speed range than the first shift characteristics, and also to characteristic changing means for selecting the first shift characteristics during ordinary driving and for selecting the second shift characteristics for accelerating the vehicle in a specific state. To this shift schedule map selection circuit 20, wherein the first and second shift characteristics have been preset by maps, are input a signal output from a shift lever position sensor 14g which detects the shift lever positions (Range; 1, 2, D, N, R, and P positions) of the automatic transmission 8, a signal output from a vehicle speed sensor 14h, a signal output from a water temperature sensor 14e, a signal output from the demanded acceleration detection circuit 24, and a signal output from the present shift position acknowledgement circuit 22 so that the shift schedule map will be selected from these various signals.

Figure 2A:
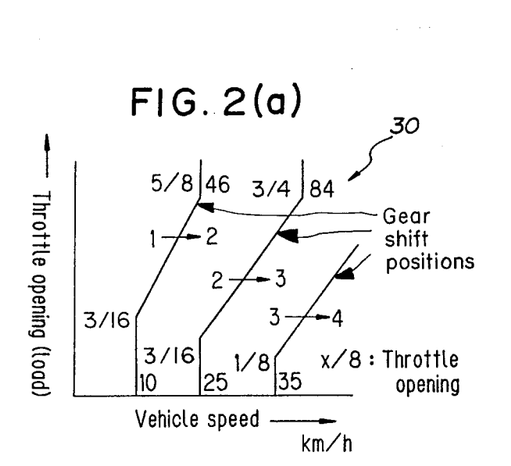
FIGS. 2(a) and 2(b) are shift schedule maps or graphs for a D range of the automatic transmission, FIG. 2(a) being a map for ordinary driving, and FIG. 2(b) being a map for acceleration.
Figure 2B:
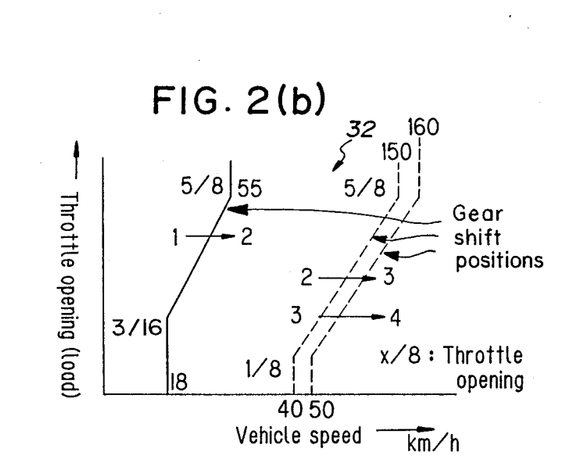

Namely, in the shift schedule map selection circuit 20 are stored a plurality of shift schedule maps each corresponding to each of the drive ranges (1, 2, D, R) selected by the shift lever. Basically, circuit 20 selects a shift schedule map of a drive range corresponding to a select position signal of a drive mode input from the shift lever position sensor 14g, and then outputs a signal to the range decision circuit 26 for changing gears. According to this control system, in the, D-range shift schedule map as shown in FIGS. 2 (a) and 2(b) are input an ordinary driving map 30 corresponding to the first shift characteristics and an acceleration map 32, corresponding to the second shift characteristics, wherein the upshift line (point) is set more on the high-speed side of the engine than in the map 30 for ordinary driving. When the D range is selected by the shift lever, the shift schedule map select circuit 20 alternatively selects the map 30 for ordinary driving and the map 32 for acceleration in accordance with signals from the water temperature sensor 14e, and the demanded acceleration detection circuit 24 and the present shift position acknowledgement circuit 22.

Furthermore, the range decision circuit 26 for gear in the automatic transmission receives signals from the shift schedule map select circuit 20, the vehicle speed sensor 14h for detecting the vehicle speed, and the throttle opening sensor 14f for detecting throttle opening as an engine load, and decides, from these signals, a gear position on the shift schedule map in the present driving operation, and then outputs the result of such decision to the final shift decision circuit 28.

To the final shift decision circuit 28 are input a signal from the range decision circuit 26 and a signal from the present shift position acknowledgement circuit 22. Based on these signals, the final shift decision circuit 28 compares the present actual gear position with the gear position on the map 30 for ordinary driving, if the shift schedule map is changed over to the map 30 for ordinary driving when the vehicle is being controlled by the use of the map 32 for D-range acceleration, and outputs an operation control signal to the actuator 10 of the automatic transmission 8 so as to match the actual gear position with the gear position on the map 30 for ordinary driving by upshifting the gears of the automatic transmission 8 one by one.

In the meantime, the air-fuel ratio control means 16 consists of a basic fuel injection pulse computing circuit 34, an air-fuel ratio control range decision circuit 36, a final injection pulse computing circuit 38, and a secondary air supply control circuit 40.

This air-fuel ratio control means 16 is a control means to which are set at least a first range of air-fuel ratios which is determined in accordance with the engine speed, and a second range of air-fuel ratios which controls the air-fuel ratio to enrich the mixture more than that in the first range of air-fuel ratios. Particularly when the map for acceleration has been selected, means 16 functions to expand the first range of air-fuel ratios, thereby narrowing the second range of air-fuel ratios. Here, the first range of air-fuel ratio is a feedback range which is controlled on the basis of a detected value from an $O_2$ sensor 14a.

To the basic injection pulse computing circuit 34 are input signals from an airflow meter 14c, a crank angle sensor 14b, and an engine speed sensor 14d. From these signals, the basic fuel injection pulse is computed, and a result of this computation is output to the final injection pulse computing circuit 38 and the secondary air supply control circuit 40.

Figure 3A:
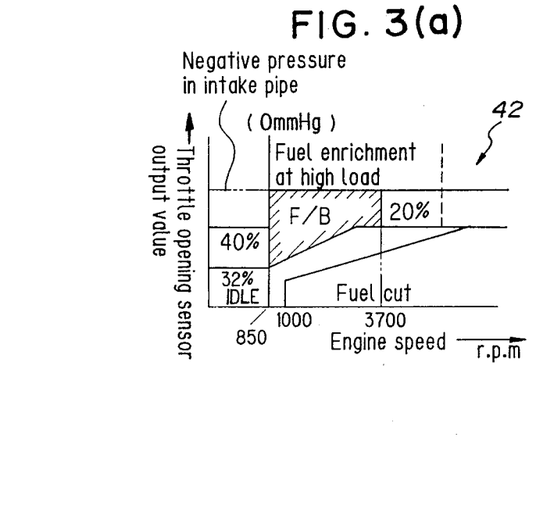
Figure 3B:
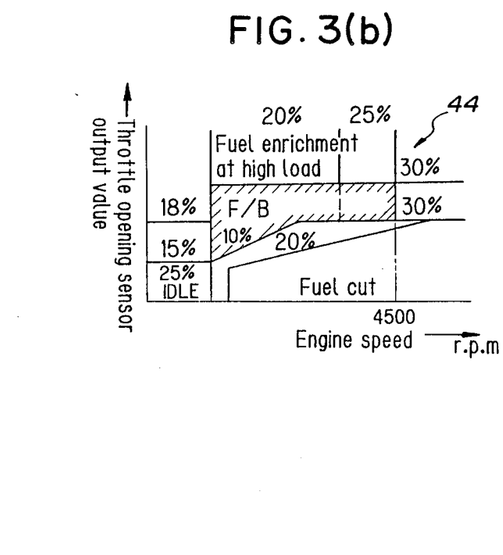

Also, to the air-fuel ratio control range decision circuit 36 are input signals from the engine speed sensor 14d, the water temperature sensor 14e and the throttle opening sensor 14f, and a signal from the demanded acceleration detection circuit 24. In addition, in the air-fuel ratio control range decision circuit 36 are previously stored, as shown in FIGS. 3 (a) and 3 (b), two air-fuel ratio control maps 42 and 44 for ordinary driving and for acceleration, which are determined on the basis of a relationship between the engine speed and the throttle opening (engine load). The air-fuel ratio control map 44 for acceleration has a feedback F/B range expanded more toward the high-speed side of the engine operation than the air-fuel ratio control map 42 for ordinary driving.

Furthermore, the air-fuel ratio control range decision circuit 36 alternatively selects the air-fuel ratio control map 42 for ordinary driving and the air-fuel ratio control map 44 for acceleration in accordance with a signal from the demanded acceleration detection circuit 24 and signals from the engine speed sensor 14d, the water temperature sensor 14e and the throttle opening sensor 14f. At the same time, circuit 36 judges in which air-fuel ratio control range on the selected map 44 or 42 is positioned the operating condition of the engine, and then outputs a result of this judgement to the final injection pulse computing circuit 38 and the secondary air supply control circuit 40.

In the meantime, in the final injection pulse computing circuit 38 are previously stored data on correction values corresponding to respective air-fuel ratio control ranges. Also input to circuit 38 are a signal from the basic injection pulse computing circuit 34 and a signal from the air-fuel ratio control range decision circuit 36, as well as a signal from the $O_2$ sensor 14a. Then, the final injection pulse is computed from these signals, and the data on correction values, is output a final operation control signal to the injector 4 of the engine 2 to perform open control or feedback control of the air-fuel ratio.

Figure 7:
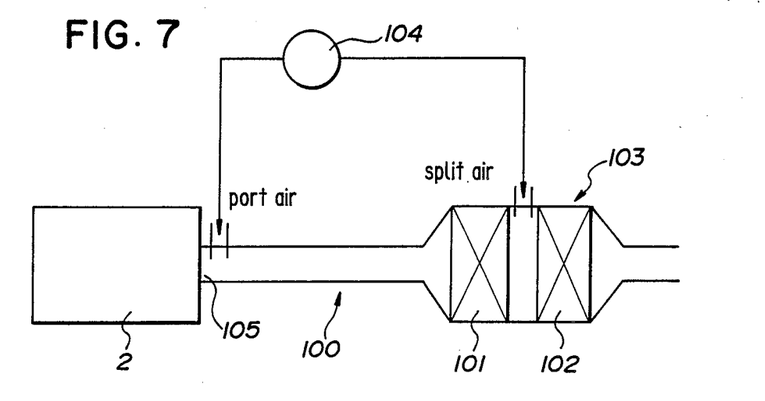
FIG. 7 is a schematic diagram showing an exhaust system of an engine employing the control system for a vehicle with an automatic transmission of the present invention.

In FIG. 7 is shown an exhaust system 100 of the engine 2. This exhaust system 100 is provided with a catalyst device 103 which consists of a three-dimensional catalyst 101 and an oxide catalyst 102, and is supplied with secondary air from an air pump 104 driven by the engine 2. That is, air for recombustion of exhaust gases called port air and split air are supplied to the vicinity of an exhaust port 105 of the engine 2 and to the preceding stage of the oxide catalyst 102, respectively, thus assuring an exhaust gas with low pollutant emission.

Figure 4A:
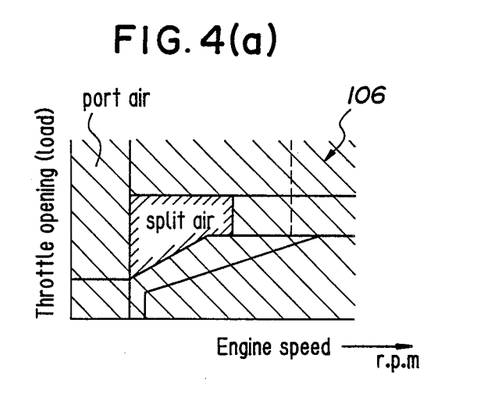
Figure 4B:
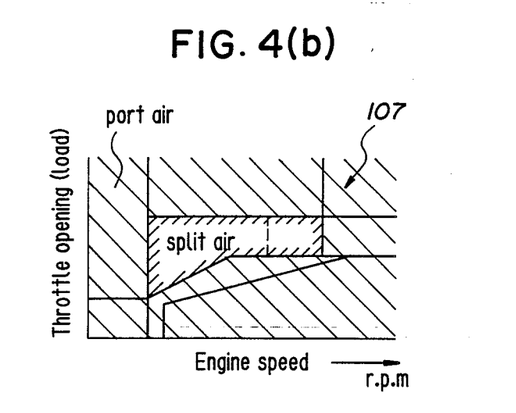

The secondary air supply control circuit 40 which controls the supply of the secondary air is designed to output a signal to control the operation of the control valve 6 in accordance with the signals from the basic injection pulse computing circuit 34 and the air-fuel ratio control range decision circuit 36. When the air-fuel ratio control map 42 for ordinary driving is selected by the air-fuel ratio control range decision circuit 36, a secondary air supply map 106 for ordinary driving (see FIG. 4 (a)) is selected in response thereto, thus controlling the operation of the control valve 6 in accordance with this map. Also when the air-fuel ratio control map 44 for acceleration is selected by the air-fuel ratio control range decision circuit 36, a secondary air supply map 107 for acceleration (see FIG. 4 (b)) with an expanded with the secondary air supply range is selected in response thereto, thus controlling the operation of the control valve 6 in accordance with this map.

In this case, the object of detection may be altered from the throttle opening to a negative pressure in an intake pipe.

Subsequently, the operation of this control system will be described with reference to the flowcharts in FIGS. 5 and 6 and the timing chart in FIG. 8.

Figure 5:
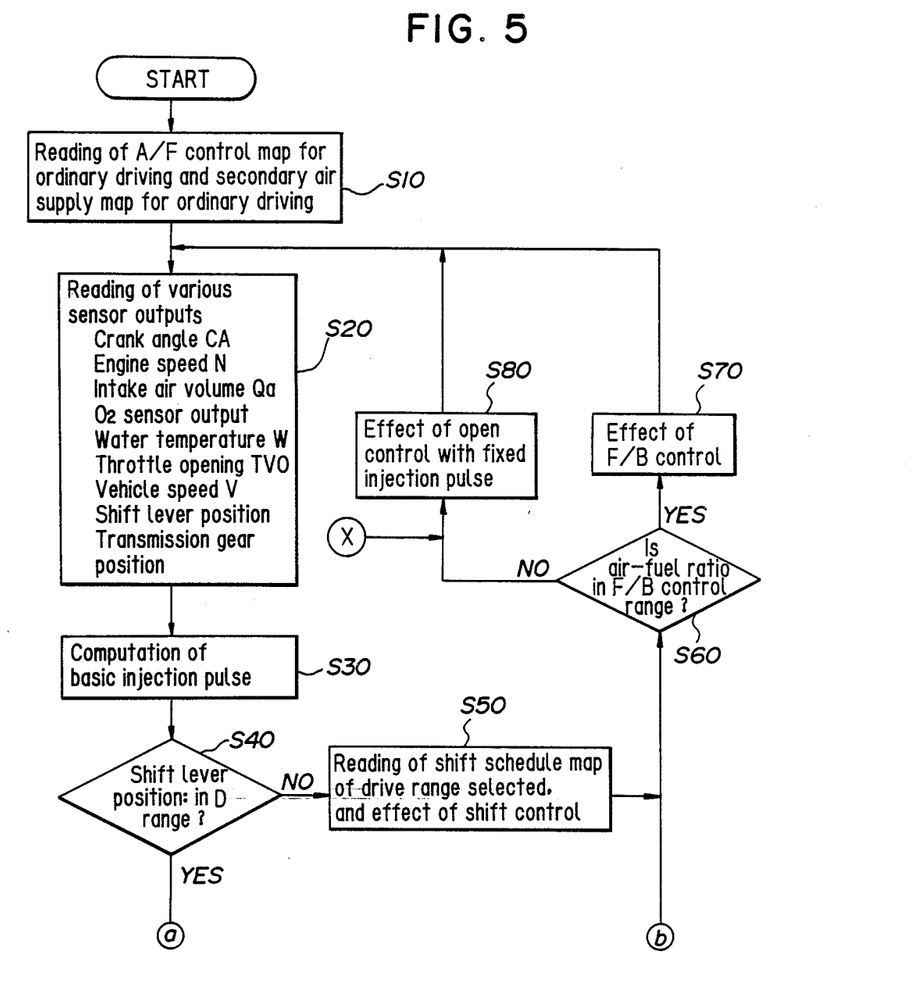
FIG. 5 is a main flowchart for the control system of the present invention.
Figure 6:
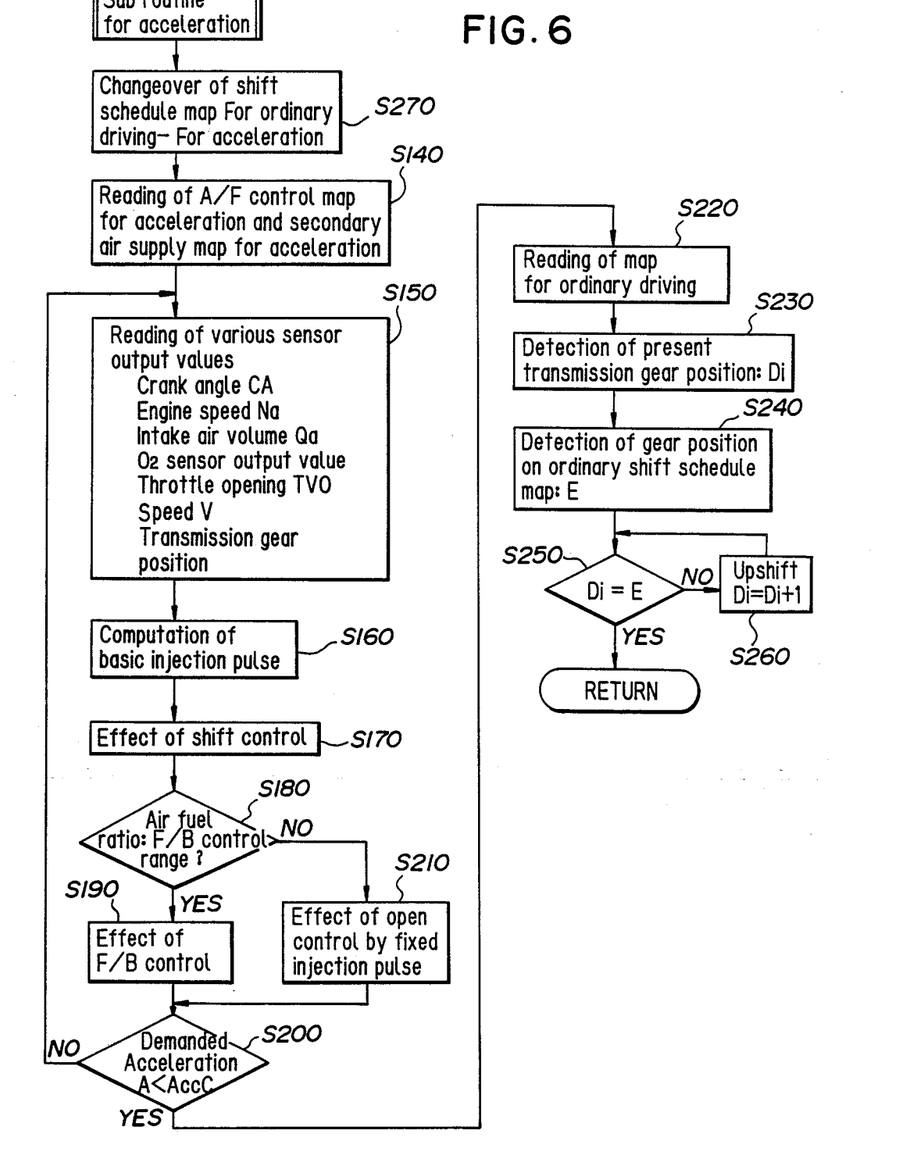
FIG. 6 is a flowchart showing a sub-routine for acceleration of the control system of the present invention.

The flowchart in FIG. 5 shows a main routine, in which, at Step S10, both the air-fuel ratio control map 42 for ordinary driving and the secondary air supply map 106 for ordinary driving are read in, and, in Step S20, signals from various sensors 14 are read in.

Next, at Step S30, the basic fuel injection pulse is computed from data obtained from the crank angle sensor 14b, the airflow meter 14c and the engine speed sensor 14d. At the following Step S40, whether or not the shift lever has been selected to D range is judged. If the answer is NO, the shift schedule map of the Drive range that has been selected by the shift lever is read in at Step S50, and the shifting operation of the automatic transmission 8 is controlled in accordance with this shift schedule map.

Next, at Step S60, whether or not the operating condition of the engine is within the feedback control range on the air-fuel ratio control map 42 for ordinary driving is judged. When the result is YES, the basic injection pulse computed at Step S30 will be corrected, at the next Step S70, toward enriching or leaning out the fuel mixture in accordance with the output value of the $O_2$ sensor 14a, and the air-fuel ratio will be feedback-controlled to be fed back to Step S20. Also, if the result of judgement at Step S60 is NO, the basic injection pulse is corrected, at Step S80, toward fuel enrichment, and is returned to Step S20 after open control of the air-fuel ratio with the fixed injection pulse.

When the result of the judgement at Step S40 is YES, the procedure goes to Step S90. At Step S90, the shift schedule map 30 for ordinary driving is read in to control the shifting in the automatic transmission 8 in accordance with this map. Subsequently, at Steps S100 to S120, a judgement is made as to whether or not the vehicle speed V is under a set value (for example, 15 km/h), whether or not the gear position Di of the transmission 8 is a low gear position (for example, 1st speed, 2nd speed), and whether or not the demanded acceleration A is over a set value AccB. When the result of each of these judgements is NO, the procedure is returned to Step S60, from which the above-described control will be repeated. In this embodiment, the demanded acceleration A is determined by the amount of change in the throttle opening. Concretely speaking, a difference between the preceding value of throttle opening and the present value of throttle opening is computed, and from this difference, whether or not the demanded acceleration A exceeds the set value AccB is judged.

When the result of each judgement at Steps S100 to S120 is YES, whether or not the water temperature W exceeds a specified value (for example, 50° C.) is judged at the next Step S130. When the result of this judgement is NO, the procedure is returned to Step S80, from which the above-described control will be repeated. When the result is YES, the procedure proceeds to a sub routine for acceleration shown in FIG. 6.

In the sub routine for acceleration, the D-range shift schedule map is changed from the map 30 for ordinary driving over to the map 32 for acceleration at Step S270. Then, at Step S140, the air-fuel ratio control map 44 for acceleration and the secondary air supply map 107 for acceleration, which expands the split air supply range toward the high-speed side of the engine 2, will be read in.

Subsequently, at Step S150, signals from various sensors 14 are read in. At the next Step S160, the basic injection pulse is computed. Then, at the next Step S170, shift control is carried out in accordance with the map for acceleration.

Next, at Step S180, a judgement is made on whether or not the engine operating condition on the air-fuel ratio control map 44 for acceleration is within the feedback control range. When the result is YES, the basic injection pulse computed at Step S160 is corrected, at the next Step S190, toward enriching or leaning out the fuel mixture in accordance with the output value of the $O_2$ sensor 14a, thereby performing the feedback control of the air-fuel ratio. After this control, the procedure proceeds to the next Step S200. If the result of judgement at Step S180 is NO, a correction for fuel enrichment will be made at Step S210 and, after the air-fuel ratio is open-controlled by the fixed injection pulse, the procedure will proceed to Step S200.

At Step S200, a judgement is made as to whether or not the demanded acceleration A is under the set value AccC. When the result of this judgement is NO, the procedure is returned to Step S150. The above-described control is repeated until this result of the judgement at step S200 becomes YES. Then, if this judgement is YES, the procedure is forwarded to the next Step S220. The set value AccC is set, for example, to a negative value and used to judge that the accelerator pedal has been returned (the end of acceleration, or deceleration).

At Step S220, the map 30 for ordinary driving of the shift schedule map is read in, and, at the next Step S230, the present actual gear position Di is detected. Then, at the next Step S240, the gear position E on the map 30 for ordinary driving in accordance with the present operating condition of the vehicle is detected. After this detection, a judgement is made, at Step S250, as to whether or not the present gear position Di agrees with the gear position E on the map 30 for ordinary driving. If the result of this judgement is NO, an upshift is made in the automatic transmission 8 at Step S260. Then, the procedure is returned again to Step S250. The control at Step S260 will be repeated until the result of judgement at Step S250 becomes YES. When, at Step S250, the result is YES, the control in this sub routine will end, returning again to the main routine in FIG. 5.

Figure 8:
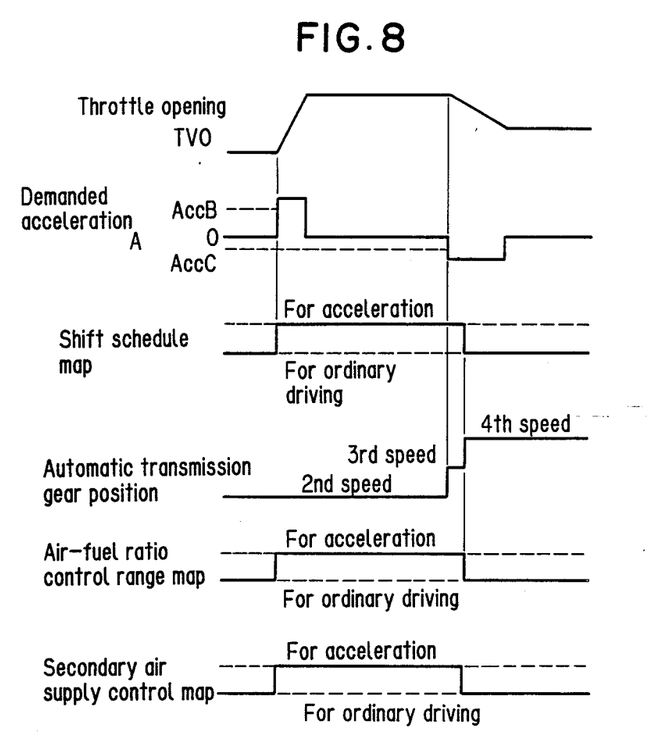
FIG. 8 is a timing chart of the control system of the present invention.

Therefore, in the present system that performs the above-described control, as shown in the timing chart in FIG. 8, when the demanded acceleration A exceeds the set value AccB during vehicle operation in D range, the D-range shift schedule map will be changed from the map 30 for ordinary driving over to the map 32 for acceleration if the vehicle speed V is under a specified value at that point of time, and the gear position Di is a low-speed position, and further the water temperature W is over a set value, thereby controlling the shifting in the automatic transmission 8. Consequently, the upshift point of the automatic transmission 8 is shifted toward the high-speed side of the engine operation. In this state, vehicle acceleration is maintained in low gear, a great acceleration force being maintained for a long period of time. The engine 2, therefore, achieves high-speed operation, but an increase in engine load can possibly be controlled.

At the same time, the air-fuel ratio control map is changed from the map 42 for ordinary driving over to the map 44 for acceleration that the feedback range has been expanded to the high-speed side of the engine. The engine 2, therefore, is operated at a high speed while restraining an increase in its load, thereby possibly positioning the operating condition of engine within the feedback range of the air-fuel ratio control map 44 for acceleration. In consequence, the air-fuel ratio is feedback-controlled to the vicinity of a theoretical air-fuel ratio, thus possibly restraining the worsening of fuel economy likely to be caused by a correction for fuel enrichment during a high-load engine operation.

This fuel enrichment control, occurring only during acceleration, will end in a short period of time, and accordingly will never result in an adverse effect, such as temperature rise, to the exhaust system.

According to the embodiment described above, a vehicle deceleration condition is detected to change the map 44 for acceleration over to the map 42 for ordinary driving. It may be so constituted that the map is automatically changed after the lapse of the time at which a changeover to deceleration is presumed is counted by a timer.

Furthermore, in the embodiment described above, the control system applied to a finitely variable transmission has been described as an example, but can naturally be applicable also to infinitely variable transmissions.

What is claimed is:

1. A control system for a vehicle with an automatic transmission, said system comprising:
    an automatic transmission in which a thereof is automatically changed in accordance with at least one operating condition of the vehicle;
    a control means set for at least a first range of air-fuel rations to be determined in accordance with engine speed and a second range of air-fuel rations for controlling the air-fuel ration of the engine to enrich a fuel mixture thereof more than in said first range of air-fuel ratios;
    a shift control system having a first shift characteristic setting means for setting a first shift characteristic, and a second shift characteristic setting means for setting a second shift characteristic wherein an upshift of said automatic transmission occurs at a higher range of vehicle speed than occurs in said first shift characteristic;
    a characteristic changing means for selecting said first shift characteristic during non-power operation and said second shift characteristic during a specific operation condition of the vehicle; and
    an air-fuel ratio changing means for expanding said first range of air-fuel ratios toward higher speed operation of the engine when said second shift characteristic has been selected by said characteristic changing means and thus narrowing said second range of air-fuel ratios, thereby improving fuel economy.

2. A control system for a vehicle with an automatic transmission as claimed in claim 1, wherein said automatic transmission is a multiple-speed transmission having a plurality of gear ratios.

3. A control system for a vehicle with an automatic transmission as claimed in claim 1, further comprising sensors for detecting vehicle speed and engine load as said at least one operating condition of the vehicle to automatically change the gear ratio of said automatic transmission.

4. A control system for a vehicle with an automatic transmission as claimed in claim 1, wherein said first and second shift characteristic setting means comprise electronic preset maps.

5. A control system for a vehicle with an automatic transmission as claimed in claim 1, further comprising a shift changing means for selecting said second shift characteristic at a specific state of acceleration of the engine.

6. A control system for vehicle with an automatic transmission as claimed in claim 1, wherein a change from said first shift characteristic to said second shift characteristic is effected by said characteristic changing means when acceleration of the engine has been detected, and a reset from said second shift characteristic to said first shift characteristic is effected when deceleration of the engine has been detected.

7. A control system for a vehicle with an automatic transmission as claimed in claim 6, wherein the reset from said second shift characteristic to said first shift characteristic which is effected by said characteristic changing means is performed by upshifting the gear ratio of said automatic transmission one by one.

8. A control system for a vehicle with an automatic transmission as claimed in claim 1, further comprising means for supplying split air to an exhaust system catalyst of the engine, whereby such supply is increased toward higher speed operation of the engine in correspondence with the expansion of said first range of air-fuel ratios by said air-fuel ratio changing means when said second shift characteristic has been selected by said characteristic changing means.

9. A control system for a vehicle with an automatic transmission as claimed in claim 1, wherein said first range of air-fuel ratios is a feedback range, and further comprising an $O_2$ sensor controlling said feedback range.

10. A control system for a vehicle with an automatic transmission which controls an air-fuel ratio of the engine of the vehicle and shifting said automatic transmission in accordance with engine speed and load and the vehicle speed, said control system comprising:
    a shift control means, including a shaft schedule map for ordinary operation of the engine and a shift schedule map for acceleration operation of the vehicle in which upshift of the automatic transmission occurs at a higher range of vehicle speed than occurs in said shift schedule map for non-power operation ordinary driving, for controlling shifting of said automatic transmission by changing from said shift schedule map for non-power operation to said map for acceleration when a demanded acceleration of the vehicle has exceeded a set value; and
    an air-fuel ratio control means for enriching a fuel mixture to the engine when the engine has exceeded a set speed during ordinary operation and for narrowing the range of engine speed at which such fuel enrichment occurs during acceleration operation when said demanded acceleration of the vehicle has exceeded said set value.

* * * * *